United States Patent [19]

Liebermann

[11] Patent Number: 4,788,858

[45] Date of Patent: Dec. 6, 1988

[54] FUEL INJECTOR TESTING DEVICE AND METHOD

[75] Inventor: Leonard N. Liebermann, La Jolla, Calif.

[73] Assignee: TIF Instruments, Inc.; Miami, Fla.

[21] Appl. No.: 81,990

[22] Filed: Aug. 4, 1987

[51] Int. Cl.[4] .......... G01M 15/00

[52] U.S. Cl. .......... 73/119 A

[58] Field of Search .......... 73/119 A, 3, 168

[56] References Cited

U.S. PATENT DOCUMENTS 3,216,622 11/1965 Drostholm .......... 73/3 X 4,520,773 6/1985 Koslow .......... 123/198 A

OTHER PUBLICATIONS

1985 *Oldsmobile Chassis Service Manual,* vol. II, pp. 6E-130 to 6E-133, 6E-188 to 6E-191 and 6E-202 to 6E-203 (10/01/84).

*Primary Examiner*—Jerry W. Myracle

*Attorney, Agent, or Firm*—Brown, Martin, Haller & Meador

[57] ABSTRACT

Method and apparatus for the determination of the fuel flow condition of a fuel injector while the fuel injector is in its operative position in an engine are described. The device comprises a liquid reservoir, a measuring chamber for the liquid and a conduit to flow the liquid through the chamber to the injector under constant pressure, as well as electric circuitry to open and close the injector for at least one predetermined time interval. The chamber is refillable from the reservoir to a predetermined liquid level after each use. The liquid can be passed through the injector in short repeated bursts or in more prolonged flows. Comparison of the volume of liquid passing through the subject fuel injector in a given time period with the volume of a like liquid passed through a reference fuel injector in the same time period is indicative of the fuel flow condition of the subject fuel injector. The invention is applicable to fuel injectors on many types of stationary and vehicular engines, and is particularly applicable to the testing of automotive fuel injection systems.

35 Claims, 3 Drawing Sheets

FUEL INJECTOR TESTING DEVICE AND METHOD

FIELD OF THE INVENTION

The invention herein relates to the testing of fuel injectors, such as those found on automobile engines.

BACKGROUND OF THE INVENTION

There has been limited use of fuel injectors for automobile engines for many years. However, it has only been recently with the emphasis on the need to combine good engine performance with reduced emissions that the use of fuel injectors has become more widespread in the automotive industry. Injectors permit the flow of fuel through the engine combustion chambers to be much more precisely metered than is possible with conventional carbureted engines, so that the combustion can be better controlled to provide adequate engine power while reducing the amount of unburned fuel exhausted from the engine.

In order to function properly, fuel injectors are manufactured with precisely dimensioned nozzles and control valves. When the injectors are new and clean, they meter the proper amount of fuel into the combustion chamber during each injection cycle. As the engine service life progresses, however, the injector nozzles and valves gradually become coated with carbon from combustion, oil from cylinder blow-by, resins and lacquers which separate from the fuel, and similar deposits. All of these serve to clog and narrow fuel passages, thus restricting the amount of fuel which is introduced into the combustion chamber in each injection cycle. The reduced amount of fuel, of course, adversely affects engine performance, and the less efficient engine performance in turn increases engine emissions. Particularly poor engine performance occurs when the fuel injectors in an engine accumulate deposits at different rates, so that the engine's cylinders are receiving different quantities of fuel with each cycle. This is most noticeable by the tendency of the engine to run irregularly with considerable vibration, commonly known as "running rough."

A certain amount of deposit build-up is normal in engine service, and both fuel injectors and engines are designed to accommodate such routine deposits. However, maintenance of proper performance of an engine requires that the condition of the fuel injectors be monitored periodically so that excessive deterioration of fuel flow characteristics can be discovered at an early stage when chemical cleaning techniques can be effectively employed. Monitoring is also important where rough running of the engine indicates that an individual fuel injector may have significantly higher deposits than the others in that engine.

Fuel injector performance monitoring has, however, been quite difficult in the past. The recommended methods have been of two types. In the first method, all injectors are removed from the intake manifold but remain attached to the fuel lines. Then with the engine cranked for a predetermined time interval, the ejected fuel is externally collected in graduated containers, one for each injector. This procedure requires extensive labor on the part of the mechanic. In addition, spraying fuel into open containers in an engine compartment is quite hazardous. The second type of test method involves measuring the pressure drop in the fuel system with a pressure gauge. Initially the fuel system is brought up to operating pressure by turning on the ignition, thus automatically actuating the fuel pump. Next the ignition is turned off, but the fuel pressure persists owing to a check valve in the pump. Whenever a single injector is actuated by an external circuit, the pressure abruptly falls, because of liquid flow out of the injector. The magnitude of the pressure drop depends upon the amount of liquid ejected. However, the pressure drop is also dependent upon the compressibility of the test system, which is critically determined by the amount of air trapped in the pressure gauge line. For example, the less air trapped the greater will be the pressure drop. In this type of test system there is no means for precisely controlling the trapped air or bubbles in the gauge line; hence the readings are subject to considerable inaccuracy. Furthermore, there is no fixed relationship between the ejected fluid quantity and the pressure drop for a test system; given a specific pressure drop, it is not possible to calculate the quantity of fluid ejected.

There have also been numerous ways of measuring liquid volume changes or flow rates in the past. Liquid storage tanks with sight glasses to show liquid level drops are common. The accuracy of the measurement is poor, however, since the sight glass level change is equal to the bulk liquid level change, so small changes in volume are difficult to detect. Flow metering devices, such as rotameters, are also widely used, but these are bulky and not accurate for the pulsed liquid flow applicable to fuel injector operation. In addition, liquid flow rate varies during a run (from zero when the valve is opened to maximum and back to zero as the valve is closed), so for short time intervals flow rate cannot be accurately converted to liquid quantity measurements.

It would therefore be of significant value to have a testing device and method which could be easily used by a mechanic or a capable car owner to check the fuel flow condition of individual fuel injectors in an engine, without having to remove the fuel injectors from the engine. Such a device should also permit the condition measurement to be sufficiently accurate to provide the user with a precise comparison between injectors. In addition, the device should be simple and durable so that it could be readily used in the environment of a garage or repair shop. It should also be useful for other types of fuel injected engines.

SUMMARY OF THE INVENTION

The invention herein is, in one aspect, a device for determining the fuel flow condition of a fuel injector while in its operating position in an engine. In another aspect, the invention is a method for determining the fuel flow condition of a fuel injector while the injector is in its operating position in an engine.

The device comprises means to provide a liquid connection between a measuring chamber and the fuel injector; means to move liquid simultaneously through the measuring chamber and the fuel injector through the connection for a predetermined period of time under substantially constant pressure while the injector is in its operating position in an engine; and means associated with the measuring chamber to measure the quantity of the liquid passing through the chamber (and thus the fuel injector) during that period of time; with the quantity, relative to the quantity of like liquid passed in equal time by a reference fuel injector, being indicative of the fuel flow condition of the subject fuel injector.

The device may also be defined as comprising a liquid reservoir, a conduit providing passage for a liquid from the reservoir to a measuring chamber and subsequently to a fuel injector while the fuel injector is in its operating position in an engine, the calibrated liquid measuring chamber to retain a predetermined initial quantity of liquid, means connected to the chamber to maintain the liquid in the chamber under substantially constant pressure, and an activatable power source electrically connected to the fuel injector to open the fuel injector to liquid flow for at least one predetermined time interval; the power source when activated opening the fuel injector to the flow of a portion of the initial quantity of liquid from the chamber under the constant pressure through the fuel injector during the time interval, the amount of the portion of liquid, relative to the amount of like liquid passed in an equal time interval through a reference fuel injector, being indicative of the fuel flow condition of the subject fuel injector. A gas supply may be used to maintain the constant pressure. Separate means may also be provided to enable the user to replenish the liquid in the chamber from the reservoir so that the chamber is repeatedly refilled to the same level.

The method comprises containing an initial quantity of liquid under constant pressure in a measuring chamber and in a liquid conduit connecting said chamber to said subject fuel injector; passing a portion of the quantity of liquid through a fuel injector under substantially the same constant pressure during at least one predetermined time interval while the fuel injector is in its operating position in a engine; determining by reference to said measuring chamber the volume of liquid which has passed through said fuel injector during said time interval; comparing said volume of the portion of liquid passed with the volume of like liquid which passes through a reference fuel injector in an equal time interval, the comparison between the two volumes being indicative of the fuel flow condition of the subject fuel injector.

In a preferred embodiment, the invention includes timer means which permit the liquid to be passed through the injector in a series of short pulses or in a longer single flow. In another preferred embodiment, the liquid chamber from which the fuel is passed comprises a transparent, hollow, elongated structure with a rectangular (including square) cross section, and in yet another preferred embodiment the reservoir and liquid chamber cooperate such that the fluid level in the chamber may be automatically initialized to the same liquid quantity prior to each test.

The "reference" fuel injector may be another injector in the same engine, a standard clean injector of the same type previously calibrated, or any injector whose fuel flow condition can be correlated with that of the subject injector.

DETAILED DESCRIPTION AND PREFERRED EMBODIMENTS

Figure 1:
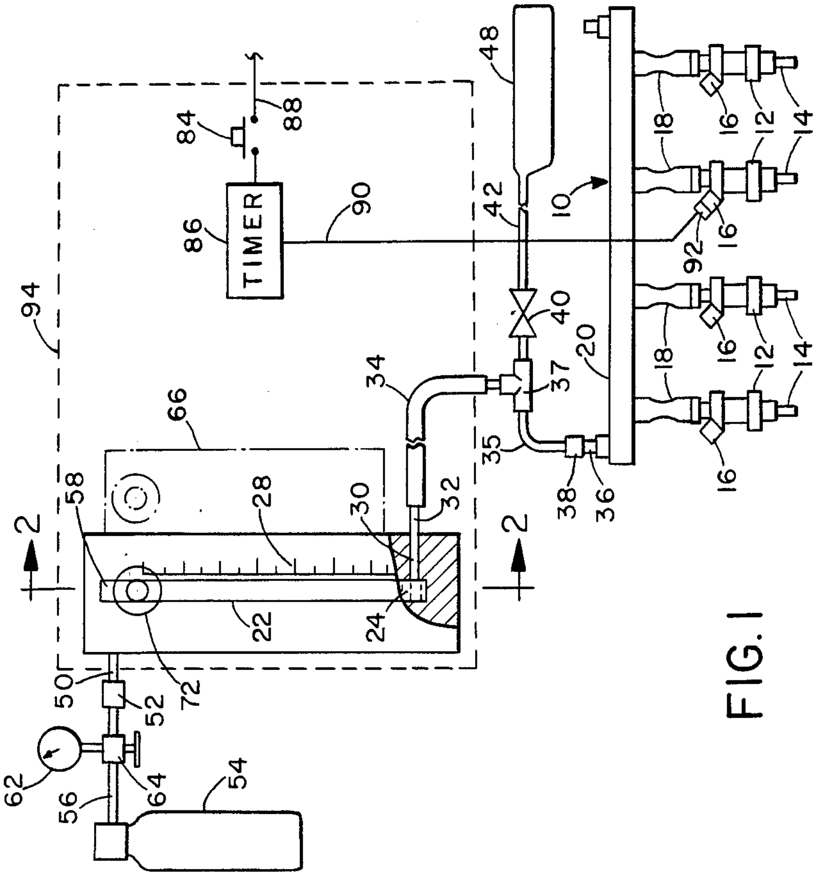
FIG. 1 is a schematic diagram of one embodiment of the system of this invention with the reservoir shown displaced (in phantom).

The basic elements of the device and method of this invention are shown in FIG. 1. Fuel injector system 10, shown for illustration purposes, is a type of system normally found on domestic automobiles. It will be understood that the present invention is applicable to all types of fuel injector systems, including those for both domestic and foreign automobile engines, as well as for other and larger types of vehicle engines such as truck engines, aircraft engines and marine engines. The present invention may also be used on stationary engines which use fuel injectors. The system 10 is illustrated as having four separate fuel injectors 12, each of which has a fuel nozzle 14. A four-nozzle system is common to many smaller (four cylinder) automotive engines, but there are, of course, many other systems with five, six, eight, twelve, sixteen, or other numbers of fuel injectors, depending on the number of cylinders in the engine, and the present invention is applicable to all such systems. Each fuel injector also has an electrical contact 16 to which power is supplied to intermittently open and close the fuel injector nozzle. Fuel is supplied to each injector through a conduit 18. The conduit 18 may be individually attached to a fuel pump or, more commonly, they are attached to common fuel supply line or "rail" 20. Use of the device of the present invention is simplified if there is a common fuel supply line 20, since a single connection to the fuel line will permit the device to be used to test each of the injectors in the system without relocating the fuel connections. On the other hand, the device may be used with systems in which fuel is delivered separately to each individual injector, but it will have to be separately connected to the fuel feed line to each injector when that injector is under test.

One of the principal components of the device of this invention is in-line measuring chamber 22, which holds the initial quantity of liquid 24 for each test. It is possible to use the present device with any type of low viscosity liquid, including water and nonflammable organic liquids. In practice, however, it will be found most convenient to use the motor fuel for which the engine is designed (e.g., gasoline or diesel fuel) and to supply the fuel from the engine's own fuel supply 48, such as a car's fuel tank. This results in the most accurate measurements, since the injectors are being tested with the specific liquid for which their operation was designed. It also avoids problems which may arise from the different physical properties of other liquids, most notably water whose surface tension can adversely affect the flow measurements. Use of liquids other than the fuel for which the fuel injection system was designed also often requires that the system and engine subsequently be purged to remove the foreign material before the engine can be run normally. (For convenience herein, the terms "fuel" and "liquid" may be used interchangeably for the liquid 24, but such does not indicate any intention to limit the scope of the invention.)

Measuring chamber 22 can be any type of container from which the amount of fuel discharged can be accurately determined. For instance, a flexible metal, rubber or plastic bellows could be used. The liquid amount discharged would be determined by measuring the amount of compression of the bellows. Alternatively, if the liquid were electrically conductive (or could be made so by incorporation of a conductive additive), a wire could run the length of the interior of the chamber and the liquid level change determined by the measured change in the wire's electrical resistance, which could be displayed as an analog or digital readout directly or in volume units. In another alternative, there could be a small magnetic float inside the chamber and the change in the liquid level in the chamber could be determined by detecting the position of the float with an electrical coil surrounding the outside of the chamber.

In the preferred version, however, chamber 22 is an elongated transparent hollow tube with a rectangular (which term includes "square") cross-section. When a tube of circular or rounded cross-section is used it has been found that the surface tension of the fuel 24 can impede the upward flow of entrapped air bubbles through the small diameter chamber. The presence of bubbles in chamber 22 is undesirable because complete filling of the chamber, particularly from the reservoir 66, is then inhibited. If the cross-section is rectangular, surface tension forces are modified by the sharp corners and chamber 22 is readily filled with fuel 24 introduced from the reservoir 66.

The preferred chamber 22 will be made of a transparent material such that the level of the liquid 24 inside can be easily observed. In most cases, glass will be quite satisfactory, particularly if it is a chemical resistant glass. Because the device is likely to be moved around frequently and be subject to the rough handling common to garages, a tempered or thickened glass may be desirable. It is also possible to use one of the chemical resistant transparent polymers, although these may be subject to internal fogging or other deterioration if certain liquids are used for the test. If a polymer is chosen, the user should be instructed as to acceptable and unacceptable liquids which may be used in the device. It is preferable that at the least any polymer chosen be resistant to fogging, darkening or discoloration by conventional motor fuels, since it will be most common that such fuels are the liquids with which the device is used.

The chamber 22 is conveniently mounted abutting or in block 26. It is calibrated as by scale 28 placed on or near the chamber so that the amount of volume change of the liquid 24 in chamber 22 during each test can be readily observed and measured. The scale 28 can be divided into any convenient volumetric units, or an arbitrary or linear scale can be used. Thus, if a particular device were always to be used for one type of fuel injector, a scale divided simply to show "acceptable" and "not acceptable" amounts of liquid passed could be used rather than having the chamber 22 calibrated in actual volume units. Such an arbitrary scale would, of course, have to be defined initially by tests with known reference fuel injectors. A simple millimeter scale has been found quite satisfactory, for with a constant and known cross-sectional area of the chamber the change in millimeters of liquid depth is directly convertible to volume of liquid.

The outlet end of chamber 22 terminates in conduit 30, which extends beyond block 26 to form nipple 32. To this is attached flexible tubing 34, which connects to the fuel injector system 10. The length of tubing 34 is not critical but will be chosen to provide a length convenient for the user to place the device of this invention in a location near the engine to be tested. Tubing lengths of three to six feet (one to two meters) will be quite satisfactory in most cases. Tubing 34 is connected into the engine's fuel supply line 35 as by tee 37. (In some automobile engines, the tee 37 is already built into the fuel system. For those engines where it is not, it could be provided with the device of this invention.) The line 35 is joined by coupling 38 to fuel rail inlet port 36. The fuel is supplied from the engine's fuel supply tank 48 through conduit 42, and the fuel can flow upstream in the device through chamber 22 to fill reservoir 66. This will normally not need to be done frequently, since reservoir 66 is preferably designed to hold sufficient liquid to allow a substantial number of injectors to be tested without having to refill the reservoir. Valve 40 is a check valve to prevent back flow of the fuel and to maintain pressure in the fuel rail 20 when the fuel pump at the fuel source is shut off.

It is necessary to maintain the liquid under substantially constant pressure throughout each test and during comparative tests, to insure that the liquid is passed through the fuel injectors in a comparable manner. The pressure can be applied mechanically, as by a spring-loaded piston, bellows or diaphragm, but preferably it will be applied as gas pressure.

In the preferred embodiment, chamber 22 terminates at its upstream end in conduit 50, which exits from block 26 to gas coupling 52. Gas from gas supply tank 54 is supplied through conduit 56 to coupling 52 to provide constant positive gas pressure in the upper portion 58 of chamber 22 above liquid meniscus 60. For safety purposes, particularly where the liquid being used for the test is a fuel, the gas should be a gas which does not support combustion such as a halogenated hydrocarbon (e.g., a "Freon" gas), nitrogen, argon or carbon dioxide. It is preferable that the gas be of low solubility in the liquid.

The gas pressure is read from gauge 62. Commonly the pressure will be maintained at about the normal operating pressure of the fuel injection system 10. For most automobile engines, that pressure is in the range of about 25 to 45 psig (172 to 310 kPa). It has been found quite satisfactory to use a gas pressure of about 30–35 psig (207–240 kPa) for normal testing of automotive engines. Valve 64 will be in gas line 56 or as part of tank 54, so that the gas flow can be turned off when the tank is uncoupled from line 50.

Another principal component of this invention is liquid reservoir 66, which contains liquid chamber 68. The reservoir 66 can be in any of a number of forms. It may be, for instance, the fuel supply source 48 itself (e.g., a car's fuel tank). This could be accomplished by turning on the car's ignition after each test to run the car's fuel pump and refill chamber 22 through line 42, valve 40, tubing 34, nozzle 32 and conduit 30. This is not a convenient method, however.

More preferably, the reservoir is built into or attached to the block 26. In the embodiment shown in FIG. 4 block 26 is in two parts, a base **26*a* and a cover 26*b*. Base 26*a* has slots milled into it to form reservoir 66' and chamber 22' as well as conduit 30', 50' and 76'. (For clarity, other fittings such as 32 and 52 are omitted in FIG. 4.) The slots are, of course, of a depth less than the thickness of base 26*a*. Cover 26*b* is transparent, so that the liquid 24 in chamber 22' can be seen. (Base 26*a* may conveniently be of the same transparent material.) Base 26*a* and cover 26*b* are secured together in a convenient liquid-tight manner, as with adhesive or by bolts passed through holes 44 and 44*a* which penetrate base 26*a* and cover 26*b***. A gasket may be placed between base 26*a* and cover 26*b* if desired but is not usually necessary if an adhesive is used.

Most preferred is the embodiment shown in FIG. 1, in which reservoir 66 is directly behind base 26 (it is shown offset in phantom in FIG. 1 to illustrate its general position). The upper end of 70 of reservoir 66 is circular and is adapted to rotate in circular opening 72 in block 26. A liquid conduit 76 passes from chamber 68 and opens into the interior of chamber 22 at a position near but spaced below the upper end of chamber 22. The rotating joint 74 is sealed by O-ring 78.

Figure 2:
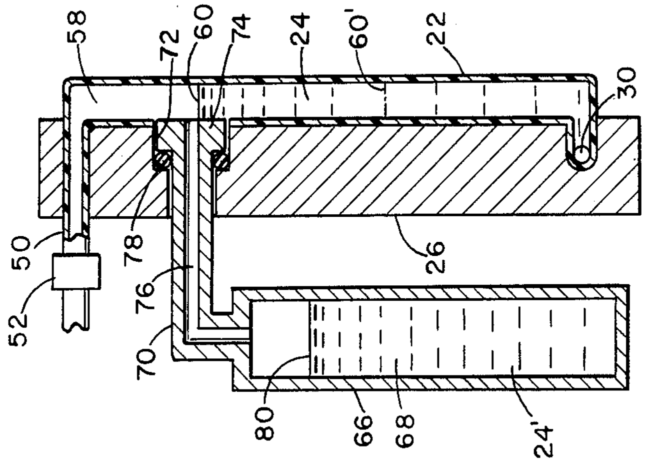
FIG. 2 is a cross-sectional view of one embodiment of the liquid measuring chamber and the reservoir taken on line 2—2 of FIG. 1.

The use of rotating reservoir 66 provides the device of this invention with the ability to have the liquid in chamber 22 be automatically refilled to the same level for each test. As will be discussed below, the liquid quantity in reservoir chamber 68 is normally maintained at less than the chamber volume, so that excess chamber capacity exists. Then following a use of the device, when the liquid level in the chamber 22 has been lowered from meniscus level 60 to meniscus level 60', before the next test run the user simply rotates the reservoir 66 so that the liquid 24' (having a depth indicated by the surface 80) in the reservoir chamber 68 flows down and through conduit 76 into the interior of chamber 22, where it mixes with liquid 24 and refills the liquid back up past meniscus level 60. When the reservoir 66 is then rotated back to its normal position, as shown in FIG. 2, the liquid above level 60 flows down through conduit 76 into chamber 68. Since the fluid 24 is incompressible and the portion of the system from chamber 22 to the fuel injectors 12 is completely filled with liquid, the liquid level in chamber 22 cannot drop below meniscus level 60, which is at the level of the bottom of conduit 76. The device is therefore automatically refilled to the same fluid level 60 for each test merely by a simple momentary inversion of the reservoir 66.

Figure 4:
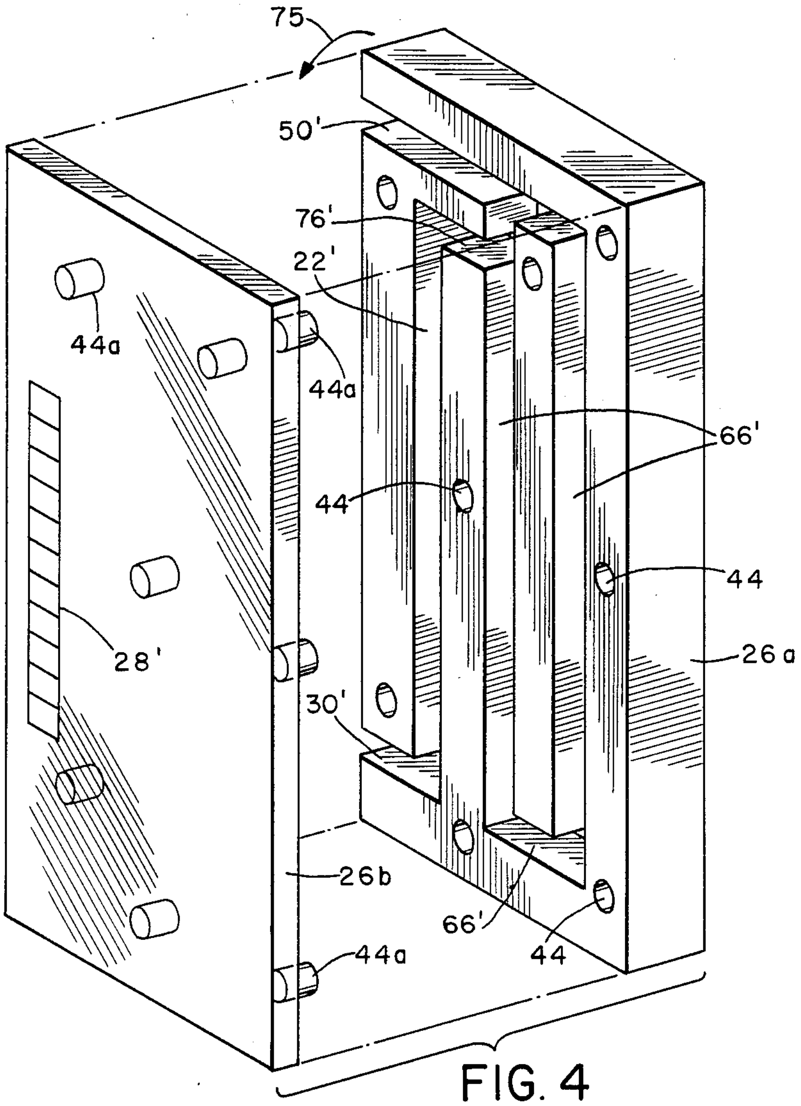
FIG. 4 is an exploded perspective view of another embodiment of the measuring chamber and reservoir.

The same is accomplished with the embodiment of FIG. 4 by simply tilting the device sideways as indicated by arrow 75, so that fuel in reservoir 66' flows through conduit 76' to chamber 22'. Righting of the device then returns the liquid level to the level of the bottom of conduit 76'.

If reservoir 66 is separate as in FIG. 1, its volume should be at least large enough to hold sufficient fuel for testing all the fuel injectors in a single engine. However, it should not be so large as to be inconvenient to rotate or too expensive to fabricate economically. A convenient size may be determined as follows: Start with the entire device (reservoir 66, chamber 22 and the associated conduit and tubing) empty of liquid (but full of air), and with valve 64 closed. When the device is connected to the fuel source and fuel flowed into the device, the air will be compressed into the reservoir 66. The fuel flow will stop when the pressure of the compressed air in reservoir 66 becomes equal to the fuel system pressure. The volume of the reservoir should be chosen such that, when the liquid volume in the chamber 22, conduit and tubing is accounted for, the reservoir will be about one-third to two-thirds full at equilibrium. For example, if the tubing is about 4 feet (1.2 m) long, the tubing, conduit and chamber 22 will have an internal volume of about 20 ml. If the reservoir is chosen to have a volume of 40 ml, it can be calculated that at a typical automobile engine pressure of 30 psi (207 kPa) the reservoir will fill with about 20 ml of liquid; i.e., it will be one-half full. Since the typical amount of liquid ejected in a single injection test is 1 ml or less, this volume will be quite adequate for testing a ordinary engine fuel injection system.

Activation of the test system is accomplished by use of electronic timer circuit 86. A source (not shown) of appropriate electrical power (such as a 12 volt battery for automotive fuel injector systems) provides current through line 88 to timer circuit 86. Line 88 is interrupted by normally open switch 84. As will be described below, the timer circuit 86 is designed to provide either a series of short electrical pulses to rapidly open and close fuel injector 12, or to provide one or more long pulses to keep the fuel injector open for a prolonged period. In either event, the timer circuit is set so that the total elapsed time that the fuel injector 12 is open is a predetermined value. Thus, for instance, if it is desired to allow the fuel to flow through the injector for a total of 0.5 seconds, the timer circuit can provide a single 0.5-second pulse to hold the injector open continuously, or a series of shorter pulses whose total time equals 0.5 seconds, such as fifty 10 msec pulses spaced at 10 msec intervals. The latter more closely simulates the actual operation of the fuel injector system in an operating engine and is, therefore, normally the operating mode of the test device. However, a complete diagnosis of fuel injector engine problems may be aided by comparing the short-pulse cycle run with a long-pulse cycle run. For instance, a problem involving slow opening of a fuel injector will be detected by noting poor fuel flow in the short-pulse cycle, as compared to the better flow rate in the long-pulse cycle, since the fuel injector does not open and close frequently in the latter cycle.

The signal from the timer 86 to the fuel injector 12 is carried through electric wire 90, which terminates in plug 92 which is plugged into contact 16 on the individual fuel injector which is the subject of the test. The subject injector stays in its normal operating position in the engine while the test is conducted, thus avoiding the time-consuming and potentially damaging process of removing and reinstalling each injector to be tested. The other fuel injectors may be disconnected or they may continue as connected to the regular power source, such as the vehicle's own electrical system. For a automotive fuel injector system which has a common fuel line 20, the device of this system can be used to quickly test all the fuel injectors merely by moving the wire 90 and plug 92 from the electrical contact 16 on one injector to that on the next injector.

Conveniently, the timer circuit 86, switch 84 and block 26 with its associated reservoir 66 and chamber 22 may be combined together in a single housing 94 (indicated by dashed lines), which also contains the various connection points for the gas conduit 56, the liquid conduit 34 and the electric wire 90.

Figure 3:
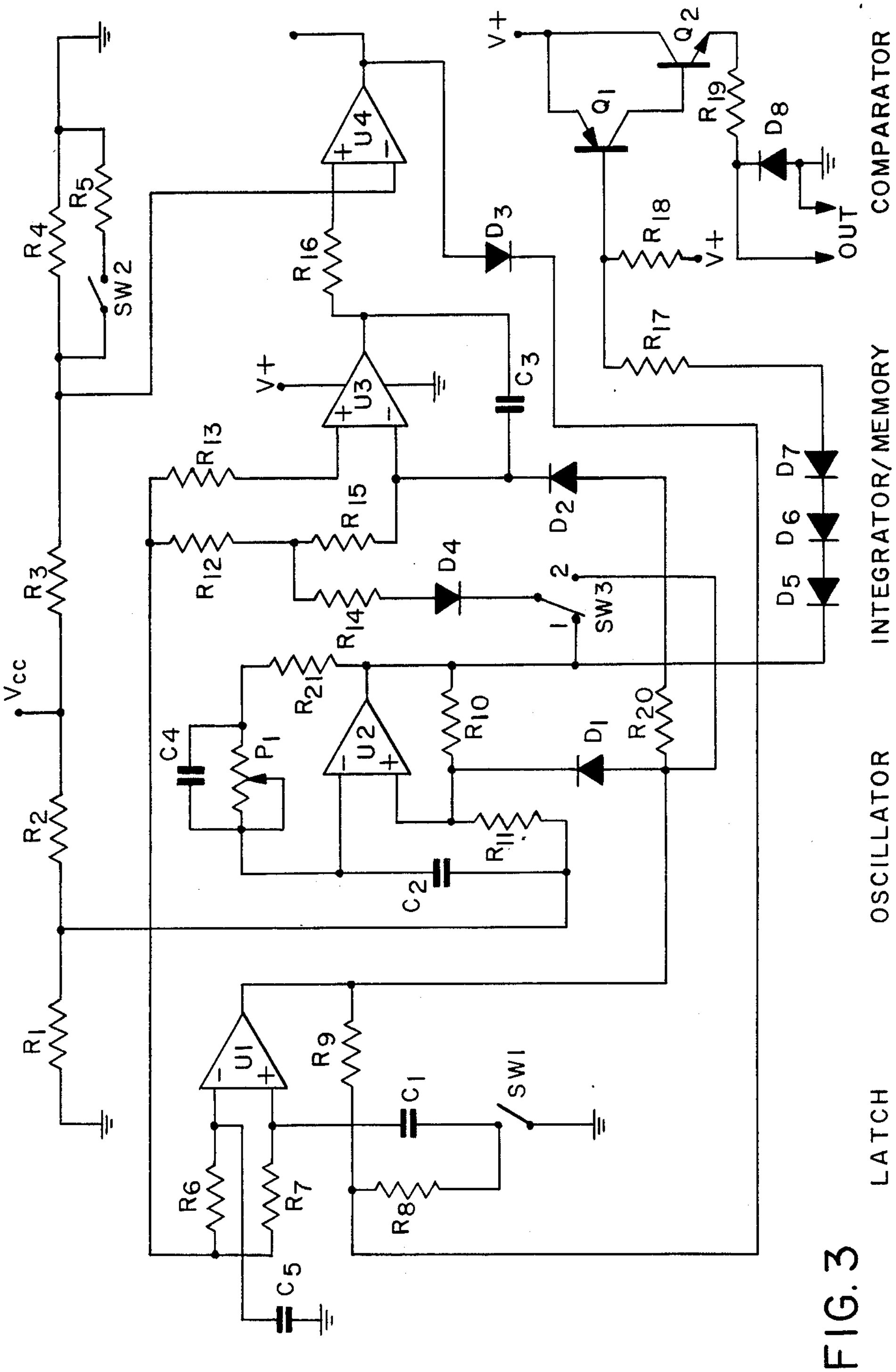
FIG. 3 is a schematic circuit diagram showing a preferred timer circuit.

A preferred circuit for timer 86 is shown FIG. 3. It will be recognized by those skilled in the art that this circuit is merely illustrative, and that many other types of timer circuits will be quite suitable. Commercial timer circuits may also be used.

The circuit illustrated offers the user the choice of four operating modes, as determined by switches SW2 and SW3. Switch SW2 determines the length of the integration time (which is the pulse train length), and a choice can be made between two time intervals. Switch SW2 can also be a multiple switch with appropriate resistors on each pole (as R5) to allow choices of additional pulse times. Switch SW3 allows one to choose multiple pulses (in position 1) or a single continuous pulse during the time interval (position 2).

The circuit consists of four functional portions: a latch, an oscillator, an integrator/memory and a comparator. The oscillator is a square-wave oscillator which forms a series of short pulses. The integrator/memory charges a capacitor linearly, rather than exponentially, so that the output voltage is proportional to the elapsed time of charging and dependent upon the input voltage. The comparator switches when the output from the integrator attains a selected value of voltage.

The operation of the circuit is readily described. Switch SW1, the "trigger," is a momentary pushbutton which the user pushes to activate the circuit. The closing of switch SW1 activates the latch and forces it into the LOW state. The circuit then activates the fuel injector through one or a series of pulses directed to the fuel injector's electrically activated valve through the OUT portion of the circuit. As the operation continues, the output of amplifier U3 will gradually increase in voltage until it reaches the level which is the switching point of the comparator. The output of the comparator, which was initially LOW, will go HIGH, which feeds back to the latch and resets it to HIGH, thus ending the pulse and completing the cycle. When the switch SW3 is in the "multiple pulse" position, the oscillator and its output is directed to the integrator and is turned on and off by the latch. The integrator output therefore increases as before but in steps corresponding to the multiple pulses. When the sum of all the short pulses is equal to the single pulse total, as determined by the choice made with switch SW2, the output of amplifier U3 reaches the comparator switching point and the cycle stops.

The oscillator circuit is set to generate square pulses at a duty cycle of 50%. However, the duty cycle can be varied by use of a diode in series with petontiometer P1, and an additional resistor in parallel. This will allow simulation of varying automobile driving conditions or other engine operating conditions.

The Table below gives the identification of one set of components which has been successfully used in the timer of FIG. 3 for the device of the present invention. The integration time is either 0.25 or 0.5 seconds, depending on the position of switch SW2, and the multiple pulse setting of switch SW3 selects either a single pulse or a series of short pulses where frequency is adjusted by potentiometer P1. As mentioned above, the present circuit is designed to provide the same total open time of the fuel injector, regardless of whether the fuel is being passed through in a single continuous pulse or a series of short pulses.

TABLE

| Component | Value or Type |
|---|---|
| Cl, C2 | 0.1 μf |
| C3 | 1 μf |
| C4 | 0.004 μf |
| C5 | 0.33 μf |
| D1-D8 | 1N914 |
| P1 | 1 M ohms |
| Q1 | 2N2907 |
| Q2 | TIP41 |
| R1, R2 | 500 ohms |
| R3 | 10K ohms |
| R4 | 30K ohms |
| R5 | 7.5K ohms |
| R6, R7 | 100K ohms |
| R8 | 11 M ohms |
| R9-R14 | 10K ohms |
| R15 | 100K ohms |
| R16 | 10K ohms |
| R17 | 470 ohms |
| R18 | 2.2K ohms |
| R19 | 5 ohms, 12 W |
| R20 | 20K ohms |
| R21 | 100K Ohms |
| U1-U4 | LM324 |

In tests with conventional automotive fuel injectors and automotive injector systems, the device of this invention has been found to provide fuel flow measurements with a reproducibility of 95% or greater in repeated tests, and often significantly more than 98%. The exemplary test system utilized a transparent liquid chamber 22 having an inside cross-section of ⅛ inch (3.2 mm) square and a 8-inch (20 cm) length. A test cycle of 0.5 second total flow duration (whether pulsed or steady) resulted in a drawdown of approximately one-half to two-thirds of the liquid 24 in the chamber 22. The liquid used was ordinary motor gasoline. Measurement of the fall in liquid level by visual comparison with an adjacent linear scale was found to be convenient and accurate. The amount of fuel discharged into the automotive cylinder by the test (0.7 ml) was not sufficient to cause any significant problem of flooding of the engine when the test was completed and the engine was restarted.

As will be evident from the above description, the device of this invention is compact, convenient and easily used by a professional engine mechanic or a knowledgeable amateur. With the device of this invention one can readily determine the comparative condition of all of the fuel injectors in the engine under test. Also, by comparison of the test results of a fuel injector of known condition, one can readily determine the absolute condition of any given injector. There are a relatively small number of fuel injector types in common automotive use today, and most motor fuels for automotive engines are essentially alike. Representative numbers of new injectors of each type can be tested with this device using conventional motor fuels, and the results published as specification sheets or in convenient tabular form. The mechanic or car owner, therefore, need only compare his results when testing the engine for each injector with the published data for clean injectors of the same type using a like fuel for a like test-flow time interval to have an immediate determination of the degree to which the test injector differs from the standard new injector in its fuel flow characteristics. It will, of course, be normal that a fuel injector which has been in service will have reduced fuel flow characteristics as compared to a new clean injector, since buildup of some carbon and deposits on an injector in service are inevitable. However, by having the direct comparison, the mechanic or car owner can determine immediately whether the degree to which the fuel flow characteristics of the test subject fuel injector are decreased is sufficiently great to warrant cleaning of the injector, either by chemicals incorporated into the fuel or by a more drastic step of removing the fuel injector from the engine and manually cleaning it. It can also be determined in many cases by comparison of the test data with the published data for clean injectors whether the subject fuel injector characteristics are so badly deteriorated that complete replacement of the fuel injector is warranted.

In a typical application, the user will only compare each injector in an engine to the others on the same engine to see if there are any significant variations among them. If there are, the more clogged injector or injectors can be identified and cleaned or replaced.

It will be evident that there are many embodiments of the present invention in both its apparatus and method aspects, which are not described above but which are clearly within the scope and spirit of the invention. The above description is therefore intended to be exemplary only, and the scope of the invention is to be limited solely by the appended claims.

I claim:

1. A device for determining the fuel flow condition of a fuel injector while the injector is in its operating position in an engine, which comprises:

a measuring chamber;

means to provide a liquid connection between said measuring chamber and the fuel inlet of said fuel injector:

means to move liquid simultaneously through said measuring chamber and said fuel injector through said connection for a predetermined period of time under substantially constant pressure; and means associated with said measuring chamber to measure the quantity of said liquid passing through said fuel injector in said period of time, said quantity, relative to the quantity of like liquid passed in equal time by a reference fuel injector, being indicative of said fuel flow condition of said fuel injector.

2. A device as in claim 1 further comprising means to control the opening of said fuel injector to liquid flow.

3. A device as in claim 2 wherein said means to control comprises an electrical timer which causes said fuel injector to be open for liquid flow for a single longer time period or a series of shorter closely spaced periods whose total duration equals the duration of said single longer time period.

4. A device as in claim 1 further comprising means to store liquid in a quantity sufficient to move said liquid through a plurality of fuel injectors for the respective time interval of each.

5. A device in claim 1 wherein said means to measure comprises means to make a visual observation of the change in liquid quantity in said chamber.

6. A device as in claim 1 wherein said means to measure comprises means to make an electrical determination of said quantity.

7. A device for determining the fuel flow condition of a fuel injector while said fuel injector is in its operating position in an engine, which comprises, a liquid reservoir;

a measuring chamber;

a conduit providing passage for said liquid from said reservoir to said measuring chamber and from said chamber to the fuel inlet of said fuel injector;

said chamber to retain a predetermined initial quantity of said liquid;

pressurization means connected to said chamber to maintain the liquid in said chamber under substantially constant pressure; and an activatable power source electrically connected to said fuel injector to open said fuel injector to liquid flow for at least one predetermined time interval;

said power source when activated opening said fuel injector to the flow of a portion of said initial quantity of said liquid under said constant pressure from said chamber through said fuel injector during said time interval, the amount of said portion of said liquid, relative to the amount of like liquid passed in an equal time interval through a like reference fuel injector, being indicative of said fuel flow condition of said fuel injector.

8. A device as in claim 7 wherein said pressurization means comprises a spring-loaded device.

9. A device as in claim 7 wherein said pressurization means comprises gas under pressure in said chamber.

10. A device as in claim 7 further comprising means to refill said chamber from said reservoir to a predetermined liquid level after each use.

11. A device as in claim 7 wherein said chamber comprises an elongated hollow transparent tube.

12. A device as in claim 11 wherein the interior of said hollow chamber has a non-circular cross-section.

13. A device as in claim 12 wherein said cross-section is rectangular.

14. A device as in claim 13 wherein said cross-section is square.

15. A device as in claim 7 wherein said reservoir and said chamber are both connected to a single base through which said conduit passes.

16. A device as in claim 15 wherein said reservoir is rotatably mounted on said base.

17. A device as in claim 16 wherein said rotatable mounting is aligned with said conduit and chamber such that rotation of said reservoir to an inverted position causes liquid to flow from said reservoir to said chamber.

18. A device as in claim 17 wherein said conduit is adjacent to the top of said chamber and the surface of said initial quantity of liquid in said chamber is maintained at the level of the connection between said conduit and said chamber.

19. A device as in claim 7 wherein said power source includes a timer to determine said time interval.

20. A device as in claim 19 wherein said power source further includes a switch to permit selection of different time intervals and an integrator to control the total elapsed liquid flow time duration at a predetermined value regardless of which time interval is selected.

21. A device as in claim 19 wherein said power source activates opening of said fuel injector for a series of short time periods which in total define a single test cycle.

22. A device as in claim 19 wherein said power source activates opening of said fuel injector for a single time period which equals a single test cycle.

23. A method of determining the fuel flow condition of a fuel injector while the fuel injector remains in its operating position in an engine, which comprises:

a. containing an initial quantity of liquid under constant pressure in a measuring chamber and in a liquid conduit connecting said chamber to said subject fuel injector;

b. passing a portion of said quantity of said liquid through said fuel injector under substantially the same constant pressure during at least one predetermined time interval; and c. determining by reference to said measuring chamber the volume of liquid which has passed through said fuel injector during said time interval; and d. comparing said volume of said portion of said liquid passed through said fuel injector with the volume of like liquid which passes through a reference fuel injector in an equal time interval, the comparison between the two volumes being indicative of the fuel flow condition of said subject fuel injector.

24. A method as in claim 23 wherein after said portion of liquid is passed through said fuel injector said chamber is refilled from a reservoir through a conduit.

25. A method as in claim 24 wherein the depth of said liquid in said chamber is restored to a predetermined level after each refill.

26. A method as in claim 23 wherein said reference fuel injector is a clean fuel injector.

27. A method as in claim 23 wherein said reference fuel injector is another injector on the same engine.

28. A method as in claim 23 wherein said portion of liquid is passed through said fuel injector continually during said time interval.

29. A method as in claim 23 wherein said portion of fuel is passed through said fuel injector in a series of pulses of short time duration.

30. A method as in claim 23 wherein one portion of said liquid is passed through said fuel injector in a series of pulses of short time interval, having a predetermined total time duration, and another portion of said liquid is passed through said fuel injector in a single pulse of a time interval equal to said total time duration of said series of pulses, and the volumes of the two portions of liquid so passed are compared.

31. A method as in claim 23 wherein said fuel injector is mounted in an automobile engine.

32. A method as in claim 23 wherein said fuel injector is mounted on a truck engine.

33. A method as in claim 23 wherein said fuel injector is mounted in a aircraft engine.

34. A method as in claim 23 wherein said fuel injector is mounted in a marine engine.

35. A method as in claim 23 wherein said fuel injector is mounted in a stationary engine.

* * * * *